United States Patent [19]

Tokuda et al.

[11] 4,317,070

[45] Feb. 23, 1982

[54] CIRCUITS FOR FLASH EQUIPMENT

[75] Inventors: Ryuji Tokuda; Yukio Mashimo, both of Tokyo; Masanori Uchidoi, Yokohama, all of Japan

[73] Assignee: Canon Kabushiki Kaisha, Tokyo, Japan

[21] Appl. No.: 226,709

[22] Filed: Jan. 21, 1981

Related U.S. Application Data

[63] Continuation of Ser. No. 9,596, Feb. 5, 1979, abandoned.

[30] Foreign Application Priority Data

Feb. 7, 1978 [JP] Japan .................................. 53-12741

[51] Int. Cl.[3] ....................... H05B 41/26; G03B 15/05

[52] U.S. Cl. .................................. 315/241 P; 354/145

[58] Field of Search ............... 354/145, 127, 128, 139, 354/149, 32–35; 315/241 P

[56] References Cited

U.S. PATENT DOCUMENTS 3,912,968 10/1975 Nakamura ........................ 315/241 P
4,095,141 6/1978 Nakamura ........................ 315/241 P
4,160,933 7/1973 Tanaka ............................ 354/145 X

*Primary Examiner*—Joseph W. Hartary
*Assistant Examiner*—William B. Perkey
*Attorney, Agent, or Firm*—Toren, McGeady & Stanger

[57] ABSTRACT

A circuit for flash equipment having a trigger control switch or an SCR with its gate lead connected to a condenser through a switching transistor which is rendered conducting when the main flash capacitor is charged to the normal firing voltage and when the X sync contact is closed. After a time interval from the closure of the X sync contact, the condenser is short-circuited to prevent refiring of the flash tube. Such refiring would otherwise be caused when the condenser is recharged to actuate the SCR during the period of closure of the X sync contact.

11 Claims, 8 Drawing Figures

CIRCUITS FOR FLASH EQUIPMENT

This is a continuation of application Ser. No. 009,596, filed Feb. 5, 1979, now abandoned.

BACKGROUND OF THE INVENTION

1. Field of the Invention

This invention relates to circuits for flash equipment and, more particularly, to circuits for flash equipment wherein the flash tube need only be flashed once at a time of simultaneous occurrence of the completion of charging a main flash capacitor and the closure of an X sync contact.

2. Description of the Prior Art

In order to ensure that the flash tube is fired only once at a given instant in time in order to derive a correct flash exposure after the main flash capacitor is charged to the normal firing voltage, it is known to employ a condenser as part of an initiating circuit. Thus, the charge on the condenser is discharged to actuate a trigger circuit in response to an AND signal occurring when the main flash capacitor is charged to the normal firing voltage and when the X sync contact is closed. An example of such a flash circuit is disclosed in U.S. Pat. No. 3,912,968.

Since the actuation of the trigger circuit is controlled by the AND signal, when the exposure time is prolonged to allow sufficient recharging of the flash capacitor and the initiating circuit condenser, the flash tube will be refired at a proper time at which the X sync contact is still closed.

To solve this problem, it has been proposed to connect a differentiation circuit between the aforesaid condenser and the trigger circuit as, for example, in U.S. Pat. No. 4,095,141. With this proposal, it is impossible to avoid the above-mentioned drawback completely because of its utilization of a discharging time of a condenser constituting part of the differentiation circuit, after which time the trigger circuit is rendered effective again. Further, there arises an alternate problem that, when the voltage of the main flash capacitor attains a predetermined level at a point in time during discharging of the differentiation circuit condenser, the latter starts to be charged again. Thus, there is a high possibility of unintentionally actuating the trigger circuit which leads to refiring of the flash tube.

SUMMARY OF THE INVENTION

An object of the present invention is to provide a circuit for flash equipment which overcomes the above-mentioned conventional drawbacks by preventing the initiating circuit condenser from being recharged when it is short-circuited after the X sync contact is closed.

Another object of the present invention is to provide a short-circuiting device in the initiating circuit which is rendered effective to short-circuit a condenser after a predetermined time interval from the closure of the X sync contact so as to cut off the trigger circuit from the initiating circuit until the once-closed X contact is opened again.

Still another object of the present invention is to provide a short-circuiting device associated with a delay circuit which, after a time interval from the closure of the X sync contact, starts to produce an output for actuation of the short-circuiting device. The output continues to exist for a predetermined time interval after the X sync contact is opened again, so as to prevent the refiring of the flash tube from occurring not only during the exposure but also shortly after the termination of the exposure.

In accordance with the invention, a flash device comprises flash means for generating light for flash use, light energy storing means for storing light energy for flash use and a trigger circuit for triggering said flash means. Also included are a capacitor for storing energy to actuate the trigger circuit, an X contact arranged to be moved from a first state to a second state when a shutter is released. Included are also applying means for applying the energy stored in the capacity to the trigger circuit. The applying means is rendered operative to apply the energy stored in the capacitor to the trigger circuit when the X contact is set to the second state. Finally included are inhibiting means for inhibiting energy storage in the capacitor when the X contact is set in the second state.

For a better understanding of the present invention, reference is made to the following description and accompanying drawings, while the scope of the present invention will be pointed out in the appended claims.

DESCRIPTION OF THE PREFERRED EMBODIMENT

Figure 1:
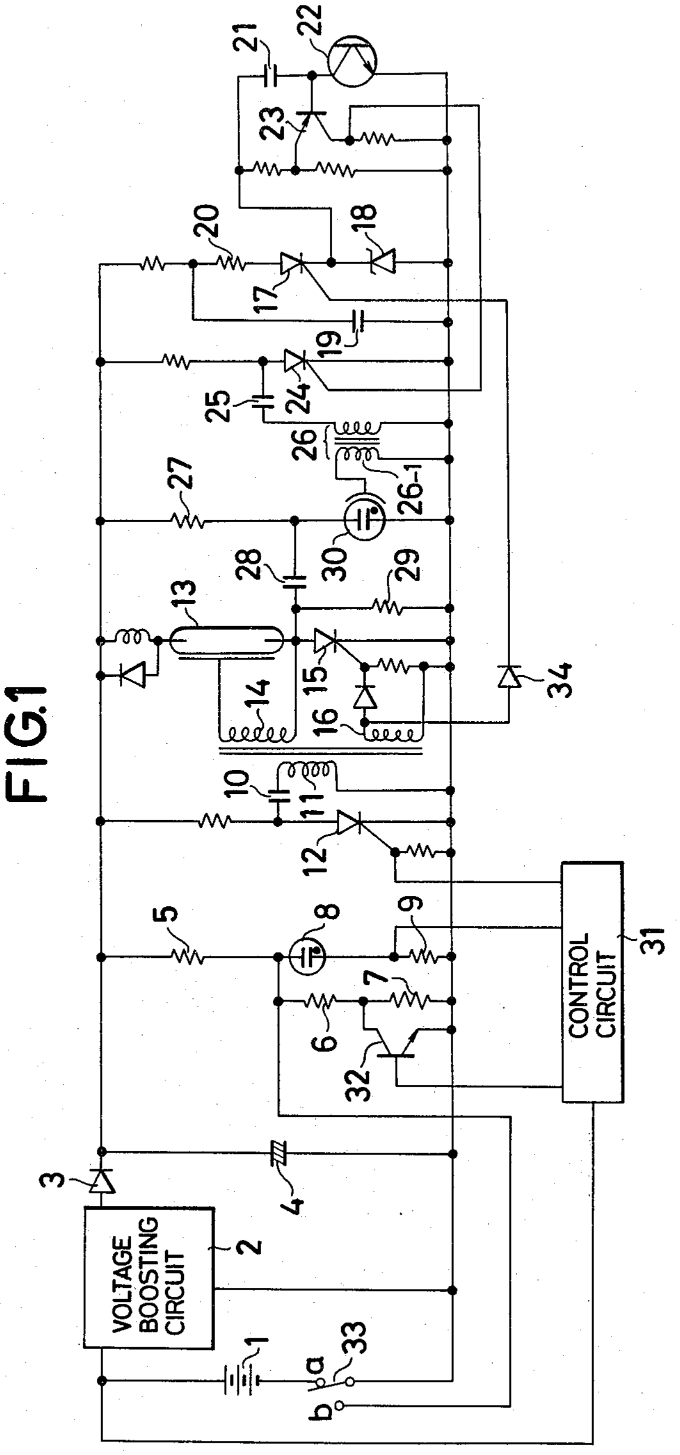
FIG. 1 is an electrical circuit diagram, partly in block form, of one embodiment of a circuit for flash equipment according to the present invention.
Figure 2:
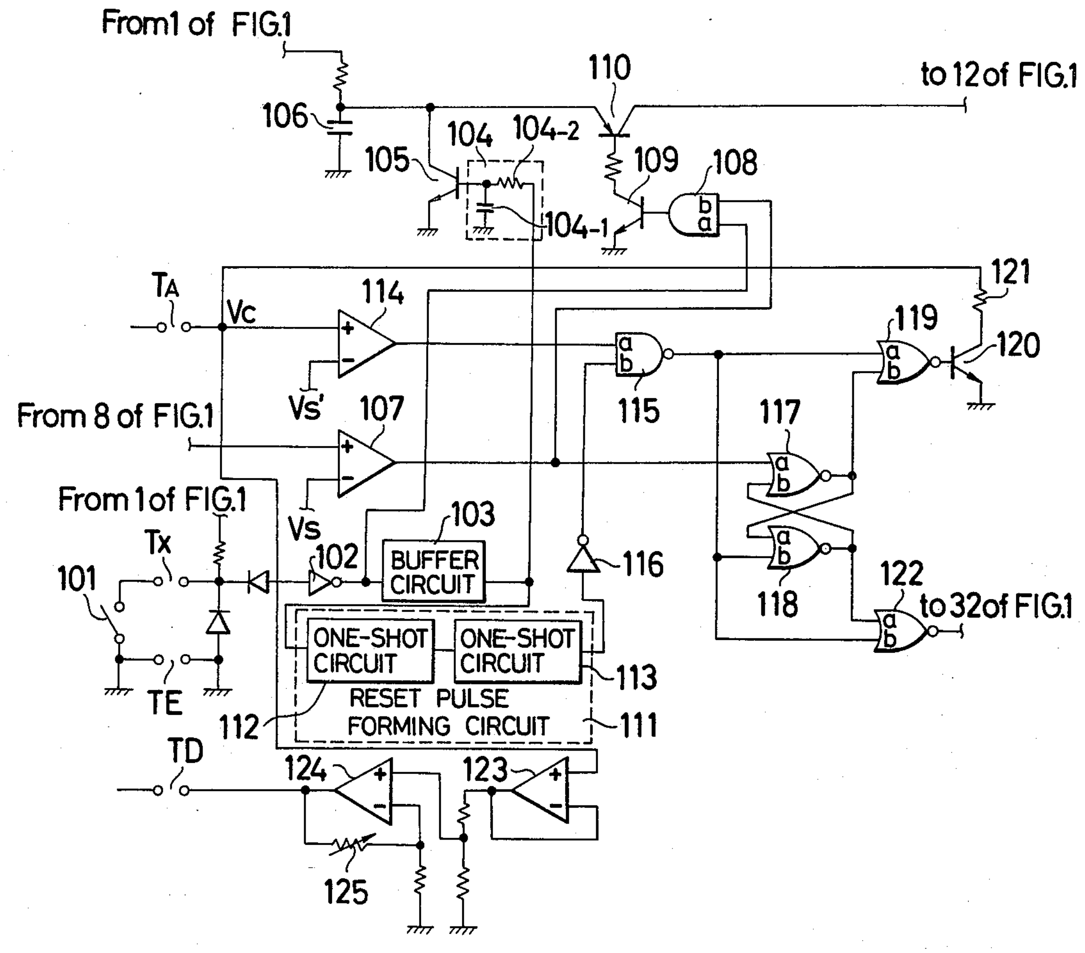
FIG. 2 is an electrical circuit diagram showing the details of block 31 of FIG. 1.

Referring to FIGS. 1 and 2, there is illustrated one embodiment of a circuit for flash equipment according to the present invention including an electrical power source or battery 1 connected across a main flash capacitor 4 through a voltage boosting circuit 2 and a rectifier diode 3. The voltage on the main capacitor 4 is divided by a string of three resistors 5, 6 and 7, across the latter two of which are connected a neon tube 8 and a resistor 9. The values of the resistors 5, 6, 7 and 9 are related to one another so that, when the voltage on the capacitor 4 exceeds a predetermined level, the neon tube 8 glows.

A trigger circuit includes a condenser 10 connected at one pole thereof to the primary coil 11 of a step-up transformer, the opposite pole of which is connected to a junction of a resistor and the anode of an SCR 12 between the positive and negative buses. The gate lead of the SCR 12 is connected to one of the two outputs of a control circuit enclosed in a block 31.

A gas discharge tube 13 is connected across the positive and negative buses through a second SCR 15 so that the voltage on the main capacitor 4 appears across the flash tube 13 when a trigger pulse is applied to the primary coil 11. The transformer has two secondary coils 14 and 16 which terminate at a coil surrounding the tube 13 and at a gate lead of the SCR 15, respectively.

A light integrating circuit includes a constant voltage source having a third SCR 17 with its gate lead connected through a diode 34 to the transformer coil 16, a Zener diode 18 connected in series to the SCR 17 and a condenser 19 connected across a series circuit of a resistor 20, the SCR 17 and the Zener diode 18, so that when the SCR 17 is ON, a constant voltage across the Zener diode 18, which lasts for a time interval predetermined by the condenser 19 and resistor 20, is applied across a condenser 21 and a photo-transistor 22 connected in series to each other.

A switching circuit includes a transistor 23 with its base connected to a point of connection between the condenser 21 and the photo-transistor 22 and with its collector connected to the gate lead of a fourth SCR 24, so that the SCR 24 is triggered when the amount of light integrated has reached a critical level for a correct flash exposure. Such triggering of the SCR 24 causes a condenser 25 to be discharged through the SCR 24 and the primary coil of a second transformer 26 which, in turn, causes the secondary coil 26-1 to produce a trigger pulse for a discharge tube 30 as a switching element. A commutation condenser 28 which is previously charged through a resistor 27 is connected across a resistor 29 together with the discharge lamp 30, and the resistor 29 connects across the anode and cathode of the second SCR 15, so that when the charge on the commutation condenser 28 is discharged, a reversed voltage is applied across the SCR 15 to stop the flash tube 13 from further firing.

In FIG. 2, there is illustrated an X sync contact 101 arranged in a camera housing to be closed when a front shutter curtain runs down to a full open aperture position, and to be opened when a rear shutter curtain shuts off the exposure aperture. In a flash unit electrically connected with the camera through interconnection terminals Tx and TE, there is an inverter 102 with its input connected through a reverse current-preventing diode to the terminal Tx and therefrom to the X contact 101 and with its output connected through a buffer circuit 103 to a delay circuit 104 which is associated with a short-circuiting means in the form of a transistor 105. The delay circuit 104 is constructed from a condenser 104-1 and a resistor 104-2 which are connected in series to each other and to the buffer circuit 103. The base of the transistor 105 is connected to the output of the delay circuit 104 so that, after a predetermined time interval from the closure of the X sync contact 101, the transistor 105 is rendered conducting to short-circuit a condenser 106 in an initiating circuit for the trigger circuit of FIG. 1.

The initiating circuit further includes a comparator 107 with its inverting input connected to a reference voltage source Vs and with its non-inverting input connected to a point of connection between the neon tube 8 and the resistor 9 (FIG. 1), an AND gate 108 with one of its inputs, a, connected to the output of the inverter 102 and with its other input, b, connected to the output of the comparator 107. Further included are a switching transistor 109 with its base connected to the output of the AND gate 108 and with its emitter grounded, and a trigger pulse supply control transistor 110 with its base connected to the collector of the transistor 109, with its emitter connected to a point of connection between the condenser 106 and the positive terminal of the battery 1 (FIG. 1), and with its collector connected to the gate lead of the first SCR 12 (FIG. 1). When the transistor 110 is turned ON, the charge on the condenser 106 is applied to the gate lead of the SCR 12, causing the trigger circuit to initiate firing of the flash tube 13.

A reset pulse forming circuit 111 includes a first one-shot circuit 112 with its input connected to the output of the buffer circuit 103 and a second one-shot circuit 113 connected in series to the first one-shot circuit 112 to produce a pulse after a predetermined time interval from the opening of the X contact 101. A comparator 114 has an inverting input connected to the reference voltage source Vs and a non-inverting input connected to an interconnection terminal Ta, at which a voltage Vc appears which is applied from the camera circuit of FIG. 3. A NAND gate 115 has an input, a, connected to the output of the comparator 114 and another input, b, connected through an inverter 116 to the output of the one-shot circuit 113. The output of the NAND gate 115 is connected to an input, a, of a NOR gate 119 which has also another input, b, connected to the output of a NOR gate 117, the latter constituting a flip-flop together with another NOR gate 118. The output of the NOR gate 117 is also connected to an input, a, of the NOR gate 118 which has another input, b, connected to the output of the NAND gate 115. The output of the NOR gate 119 is connected to the base of a transistor 120 with its emitter grounded and with its collector connected through a resistor 121 to the non-inverting input of the comparator 114. The outputs of the NAND gate 115 and NOR gate 118 are connected to respective inputs, b and a of a NOR gate 122 having an output connected to the base of a transistor 32 (FIG. 1). The collector and emitter of the transistor 32 connect across the resistor 7. A buffer amplifier 123 has a non-inverting input connected to the terminal TA and an output connected to a non-inverting input of an operational amplifier 124 with a variable feedback resistor 125 for setting the sensitivity of the used film. The output of the operational amplifier 124 is connected to an interconnection terminal TD. The interconnection terminals TA, TX, TE and TD are arranged on the flash unit housing.

Figure 4:
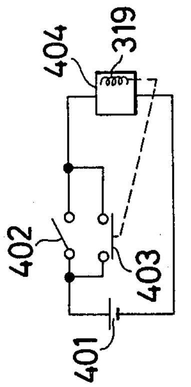
FIG. 4 is an electrical circuit diagram of a power supply control circuit in the circuit of FIG. 3.
Figure 3:
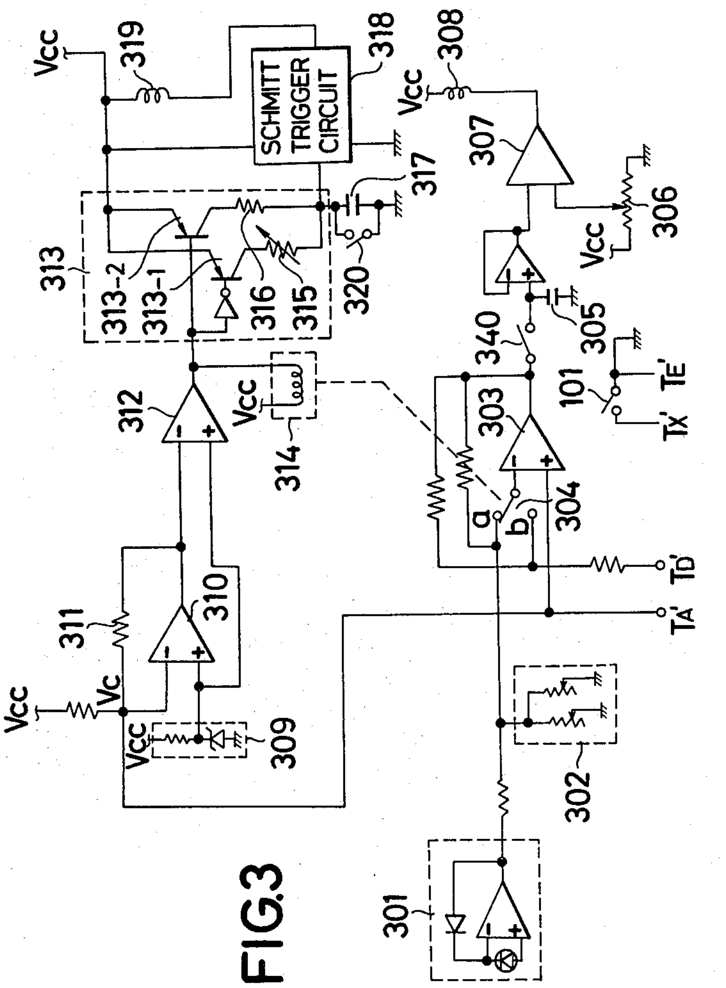
FIG. 3 is an electrical circuit diagram of an example of an exposure control circuit for daylight and flash photography in a camera usable with the circuit of FIGS. 1 and 2.
Figure 5A:
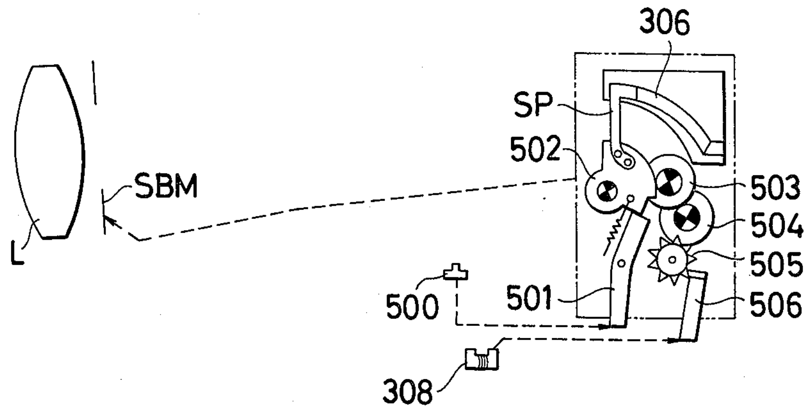
FIGS. 5(*a*) and 5(*b*) are schematic elevational and perspective views of a diaphragm setting scanning mechanism, respectively.
Figure 5B:
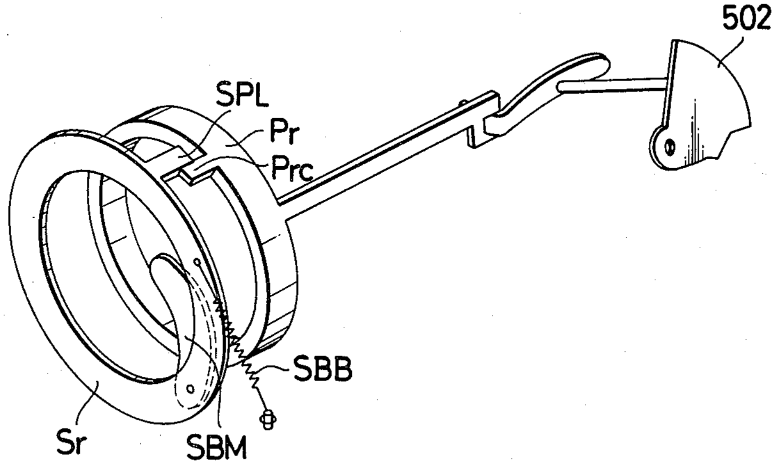

FIGS. 3 and 4 show a camera circuit including a light sensor 301 composed of a photosensitive element, an operational amplifier, a feedback diode and an exposure factor setting circuit having two variable resistors for setting the sensitivity of the used film and a desired value of shutter time. The outputs of the light sensor 301 and the setting circuit 302 are combined with each other to produce an output representative of a proper diaphragm value for daylight photography. An operational amplifier 303 has an inverting input selectively connected to the daylight and flash exposure value computers by a one pole-and-two throw switch 304 of which operation is controlled by a relay 314. The output of the operational amplifier 303 is applied to a storage capacitor 305 through a switch 340. A potentiometer 306, the position of which is varied by a diaphragm setting scanning mechanism of FIG. 5, is connected to a level detector 307 at one input thereof. The opposite input of the level detector is connected to storage capacitor 305 so that when the output of the potentiometer 306 has reached a level dependent upon the voltage on the capacitor 305, the level detector 307 produces an actuating output signal which is applied to a magnetic winding 308 so as to control the period of actuation of the scanning mechanism.

An exposure mode selecting circuit includes a constant voltage source 309, an operational amplifier 310 with its non-inverting input connected to the constant voltage source 309 and with its inverting input connected to a point of connection between a resistor and the terminal TA′ and a feedback resistor 311 connected between the inverting input and an output of the operational amplifier 310. Further included are a level detector 312 in the form of a comparator responsive to the output of the operational amplifier 310 for setting the switch 304 in either one of the positions, a and b, and for selecting either one of a variable resistor 315 and a fixed resistor 316 for connection with a timing capacitor 317 as switching transistors 313-1 and 313-2 are selectively rendered conducting. The variable resistor 315 has a resistance value related to a desired value of shutter time as it cooperates with a shutter dial. The fixed resistor has a resistance value related to a shutter time of 1/60 second, for example, suitable for flash photography. Connected across the timing capacitor 317 is a switch 320 which is arranged to be opened when the shutter is released. Responsive to the output of each of the two timing circuits, a Schmitt-type trigger circuit 318 produces an actuating signal for a magnetic winding 319 for controlling operation of the rear shutter curtain. The interconnection terminals TA′, TD′, TE′ and TX′ are arranged on the camera housing.

In FIG. 4, there is illustrated a power supply control circuit in the camera including a battery 401. The magnetic winding 319 is supplied with electrical power from the battery 401 through a main switch 402 or a hold-on switch 403 which is connected in parallel to the battery 401, the latter cooperating with the magnetic winding 319.

FIGS. 5(*a*) and 5(*b*) show the diaphragm setting scanning mechanism including a sector gear 502 on which a slider SP is fixedly mounted in a radially extending manner. When a shutter button 500 is depressed, a latching lever 501 is disengaged from the sector gear 502, causing the latter to be turned in a clockwise direction while the speed of movement of the sector gear 502 is regulated by a governor of gears 503, 504 and 505. As the slider SP moves over the resistance track 306, the output of the potentiometer 306 (FIG. 3) is varied and reaches a level dependent upon the voltage on the storage capacitor 305 at which the magnetic winding 308 is energized to actuate an arresting lever 506 so that the star gear 505 is stopped. The scanning result is introduced through a linkage shown in FIG. 5(*b*) to a diaphragm presetting ring Pr. When a diaphragm closing down member (not shown) is driven to move, a diaphragm blade control ring Sr is turned by the action of a spring SBB until a lug SPL abuts against a stop projection Prc of the presetting ring Pr. Thus, the size of the diaphragm aperture is automatically adjusted to the presetting.

Figure 6:
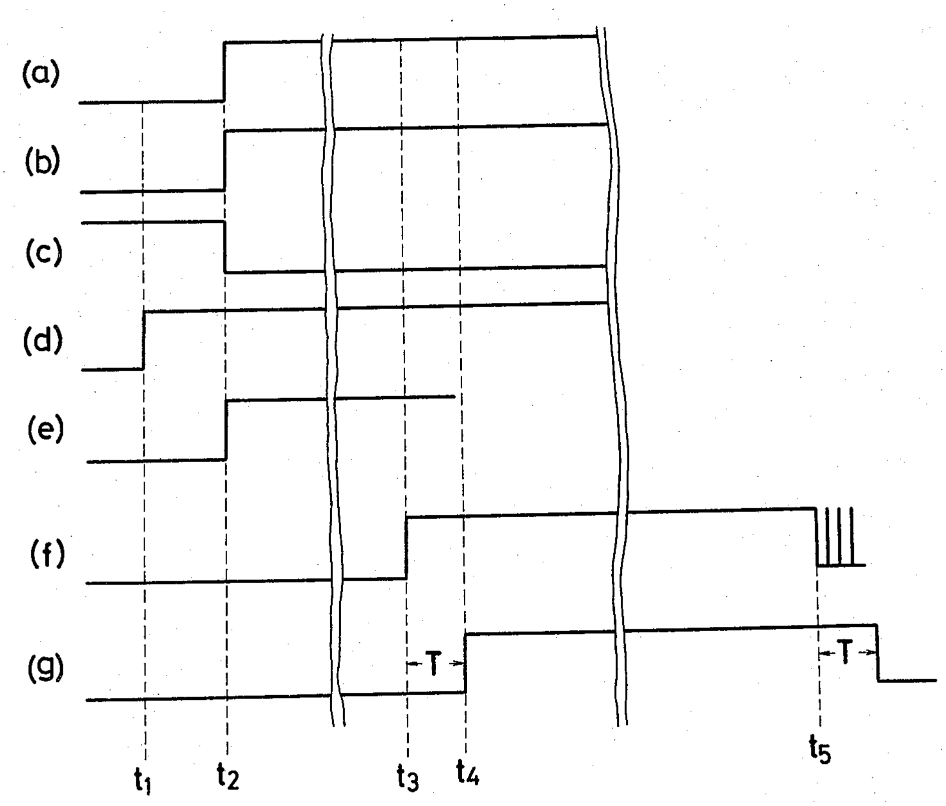
FIGS. 6 and 7 are timing charts showing how the circuit of FIGS. 1 to 4 may operate.

The operation of the circuit for flash equipment of the present invention will next be described with reference to the timing charts of FIG. 6. After the flash unit is attached to the camera, the photographer will set the switch 33 to its "a" position where the battery 1 is connected to the voltage boosting circuit 2. The increased voltage from the boosting circuit 2 is applied through the diode 3 to the main flash capacitor 4. When the capacitor 4 is charged to the normal firing voltage, the neon tube 8 is lighted at a time, t1, as shown on line (d) in FIG. 6 when a voltage of logic one value is applied to the non-inverting input of the comparator 107 (FIG. 2). After that, the photographer will depress the shutter button 500 to close the switch 402 at a time, t2, as shown on line (b). At that time, a voltage Vc appears on the inverting input of the operational amplifier 310 of FIG. 3 and is applied through the terminal TA′-and-TA connection to the non-inverting input of the comparator 114. The output of the comparator 114 changes to a "1" level which is applied to the NAND gate 115. Since the reset pulse forming circuit 111 produces a "0" output which, after being inverted to a "1" signal is applied to the NAND gate 115, the output of the NAND gate 115 changes to a "0" level at the time, t2, as shown on line (c).

Since the output of the comparator 107 changes to a "1" at the time, t1, as shown on line (d), with production of a "0" output from the NOR gate 117, the output of the NOR gate 119 changes to "1" at the time, t2, as shown on line (e). On the other hand, the output of the NOR gate 122 remains unchanged from a "0" level at the time, 2, because the change of the input "b" of the NOR gate 122 from "1" to "0" at the time, t2, occurs along with the change of the opposite input "a" from "0" to "1". Thus, the transistor 120 is turned ON by the output of the NOR gate 119, causing a current to flow through the terminal TA-and-TA′ connection to increase the output voltage of the amplifier 310. The output of the level detector 312 is thereby changed from a "1" to a "0" level at which the transistor 313-2 is ON, and the transistor 313-1 is OFF, and also at which the switch 314 is operated to move from the "a" to the "b" position. Thus, the output of the amplifier 124 is introduced through the terminal TD-and-TD′ connection to the amplifiier 303.

Upon further depression of the shutter button 500, the switch 340 is instantaneously closed to store the output of the amplifier 303 on the capacitor 305. Such depression of the shutter button 500 also causes disengagement of the latching lever 501 from the sector gear 502 to start a scanning operation of the slider SP while simultaneously moving the diaphragm presetting ring Pr. Since the resistance value of the variable resistor 306 is varying, when it has reached a level corresponding to the exposure value stored on the capacitor 305, the level detector 307 actuates the magnetic winding 308 for energization with power supplied from the camera battery 401. The arresting lever 506 is thereby brought into engagement with one of the teeth of the star gear 505. Thus, the deflected position of the diaphragm presetting ring Pr determines the amount of movement of the diaphragm blade control ring Sr when the diaphragm closing down member is operated.

After the proper diaphragm aperture has been formed, the front curtain of the shutter is released from the cocked position to run down to the full open aperture position where the switch 320 is opened and, at the same time, the X sync contact 101 is closed at a time, t3, as shown on line (f). Since the "b" input of the AND gate 108 takes on a "1" potential at the time, t1, the change of the output of the inverter 102 from "0" to "1" at the time, t3, causes the output of the AND gate 108 to change to "1", at which time the transistors 109 and 110 are turned ON to supply the gate lead of the SCR 12 with the charge from the condenser 106. Thus, the SCR 12 is gated on to discharge the charge on the condenser 10 through the primary coil 11 of the transformer, so that a trigger pulse is applied to the flash tube 13, and the gate leads of the SCRs 15 and 17. The flash tube 13 is then fired to emit an extremely intense flash of light. At the same time, the charge on the condenser 19 starts to be discharged through the Zener diode 18 and the discharging continues for a time interval during which the condenser 21 and photo-transistor 22 operate with application of a constant voltage thereacross.

The delay circuit 104 starts to operate at the time, t3, with production of ever-increasing voltages at the output thereof. After a predetermined delay time T from the time point, t3, the output voltage of the delay circuit 104 reaches the threshold level for the transistor 105 at a time, t4, as shown on line (g). In general, soon after the condenser 106 is discharged through the transistor 110 at the point in time, t3, the condenser 106 is short-circuited by the transistor 105.

When the amount of light integrated has reached a predetermined level, the transistor 23 is turned ON and the SCR 24 is turned ON, causing the charge on the condenser 25 to be discharged and causing the transformer 26 to apply a trigger pulse on the discharge lamp 30. When the lamp 30 is rendered conductive, the charge on the commutation condenser 28 is discharged through the lamp 30 to turn off the SCR 15, so that the flash tube is extinguished.

Conduction of the transistor 313-2 causes the fixed resistor 316 to be connected to the timing condenser 317. After 1/60 second, the magnetic winding 319 is de-energized to release the rear curtain from the cocked position. Such de-energization of the magnetic winding 319 also causes the switch 403 to be opened to terminate the power supply from the battery 401 to the exposure control circuit of FIG. 3. Thus, one cycle of camera operation for flash photography has been completed.

It will be understood from the foregoing that the initiating circuit condenser is short-circuited soon after the start of a flash exposure to prevent the flash tube from being refired by otherwise recharging that condenser which follows the termination of discharging of the flash tube 13 and the recharging of the main flash capacitor to the normal firing voltage. The short-circuiting of the initiating circuit condenser continues for the delay time interval T from the termination of duration of the flash exposure at the point in time, t5, as shown on line (g). Accordingly, even when the main flash capacitor 4 and the trigger condenser 10 are recharged sufficiently after the flash tube 13 has been fired once and before the X contact is opened, the change of the output of the AND gate 108 from "0" to 37 1" again does not lead to actuate the SCR 12 for formation of a trigger pulse in the secondary coils 14 and 16 of the first transformer.

Another advantage of the provision of the delay circuit in combination with the short-circuiting means is that the chattering of the X sync contact 101 which usually occurs during its return movement from the closed to the open position, though having rendered the transistor 109 conductive, is prevented to actuate the trigger circuit, as the chattering does not last beyond the delay time interval T as shown on lines (f) and (g).

Figure 7:
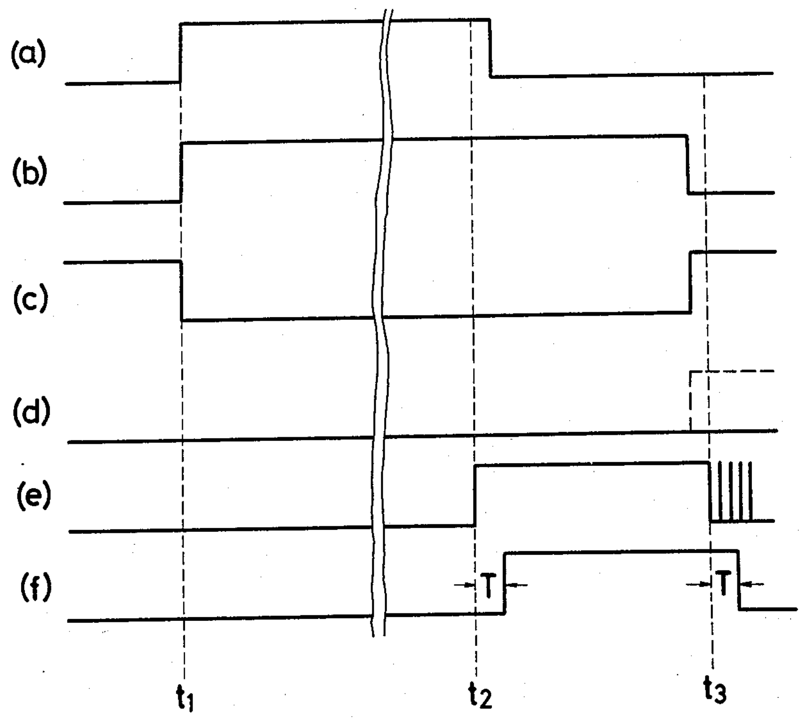

Now assuming that the main flash capacitor is not charged to the normal firing voltage at the time of depression of the shutter button, then the neon tube 8 produces a "0" output at a point in time, t1, as shown on line (d) of FIG. 7. Therefore, even when the switch 402 is closed to produce a "1" output as shown on line (a), the voltage Vc is produced as shown on line (b), and the output of the NAND gate 115 changes from a "1" to a "0" as shown on line (c), the NOR gates 119 and 122 do not produce "1" and "0" outputs as in the above flash photography, but "0" and "1" outputs, respectively. This is because, before the time point, t1, the NOR gate 118 produces a "0" output which is applied to a "b" input of the NOR gate 117, and because the neon tube 8 produces a "0" output, causing the NOR gate 117 to produce a "1" output. Thus, even at the time when the voltage Bc appears and when the output of the NAND gate 115 changes to a "0" level, the NOR gates 118 and 117 produce "0" and "1" outputs, respectively.

The "1" output of the NOR gate 122 causes the transistor 32 of FIG. 1 to be turned ON to short-circuit the resistor 7, while the transistor 120 is maintained in the non-conducting state by the output of the NOR gate 119. As a result, the amplifier 310 of FIG. 3 is cut off from the resistor 121 of FIG. 2 and, therefore, produces an output of logic one level. Responsive to this output, the level detector 312 produces a "1" output so that the changeover circuit 314 remains deactuated to permit the output of the daylight exposure computer to enter the amplifier 303.

When the shutter button is further depressed to the second stroke, the output of the amplifier 303 is applied to and stored on the capacitor 305. The diaphagm setting scanning mechanism is operated in a manner similar to that described in connection with the flash exposure, followed by the running down of the front shutter curtain to close the X sync contact 101 at a point in time, t2, as shown on line (e) of FIG. 7. Because of the "0" output of the neon tube 8, the output of the AND gate 108 is maintained at a "0" level so that the flash tube cannot be fired.

The "1" output of the level detector 312 selects the variable resistor 315 for connection with the timing capacitor 317 as the transistor 133-1 is ON and the transistor 133-2 is OFF. Thus, the shutter timing is controlled in accordance with the resistance value of the variable resistor 315. At a point in time, t3, the rear curtain runs down to terminate the daylight exposure.

Now assume that the main flash capacitor is charged to the normal firing voltage at a point in time during the exposure. Even in this case, the output of the neon tube 8 is maintained at "0" because the NOR gate 122 produces a "1" output which is applied to the transistor 32. The resistor 7 is thereby short-circuited to prevent erroneous firing of the flash tube 13.

Alternatively assuming that the main capacitor is charged to the normal firing voltage at the time when the rear curtain runs down, then the neon tube 8 is turned on to produce a "1" output as shown on line (d) of FIG. 7. This would lead to actuation of the SCR 12 if the delay circuit 104 were not provided. As shown on line (f), however, after the X sync contact 101 is opened, the transistor 105 is maintained in the conducting state for the time interval T, during which the initiating circuit condenser 106 is short-circuited to prevent the "1" output of the AND gate 108 from actuating the SCR 12.

It will be seen from the foregoing that the present invention provides a circuit for flash equipment having an initiating circuit condenser short-circuited after the X sync contact is closed. This makes it possible to ensure that the flash tube is fired only once at a desired instant in time.

While the foregoing description and drawings represent the preferred embodiments of the present invention, it will be obvious to those skilled in the art that various changes and modifications may be made therein without departing from the true spirit and scope of the present invention.

What is claimed is:

1. A flash device comprising:
(a) flash means for generating light for flash use;
(b) flash energy storing means for storing light energy for flash use;
(c) a trigger circuit for triggering said flash means;
(d) a capacitor for storing energy to actuate said trigger circuit;
(e) a terminal connectable to an X contact of a camera, said X contact arranged to be moved from a first state to a second state by a shutter release operation;
(f) applying means for applying said energy stored in said capacitor to said trigger circuit, said applying means coupled to said terminal and being rendered operative to apply the energy stored in the capacitor to the trigger circuit when the X contact is set to the second state;
(g) inhibiting means for inhibiting energy storage in said capacitor;

and
(h) means for rendering said inhibiting means operative after a predetermined time interval from the setting of said X contact to said second state.

2. A flash device comprising:
(a) flash means for generating light for flash use;
(b) light energy storing means for storing light energy for flash use;
(c) trigger circuit for triggering said flash means;
(d) a capacitor for storing energy to actuate said trigger circuit;
(e) a terminal connectable to an X contact of a camera, said X contact arranged to be moved from a first state to a second state by a shutter release operation;
(f) applying mean for applying said energy stored in said capacitor to said trigger circuit, said means coupled to said terminal and being rendered operative to apply the energy stored in the capacitor to the trigger circuit when the X contact is set to the second state;
(g) inhibiting means for inhibiting energy storage in said capacitor when said X contact is set in the second state; and
(h) a delay circuit for producing an output by which said inhibiting means is rendered operative after a predetermined time interval from the setting of said X contact to said second state.

3. A flash device according to claim 2, wherein said inhibiting means is formed by switching means and cuts off a charge path to said capacitor in response to the output of said delay circuit.

4. A flash device comprising:
(a) flash means for generating light for flash use;
(b) a battery;
(c) a boosting circuit for increasing the voltage of said battery;
(d) a main condenser connected to said boosting circuit for storing a charge;
(e) a trigger circuit for causing said flash means to be discharged by applying the charge of said main condenser thereto;
(f) a capacitor connected to said battery so that a charge is stored therein;
(g) a terminal connectable to an X contact of a camera, said X contact arranged to be moved from a first state to a second state when the shutter is released;
(h) applying means for applying the charge stored in said capacitor to said trigger circuit, said means coupled to said terminal and being rendered operative when said X contact is set to the second state;
(i) inhibiting means for inhibiting energy accumulation on said capacitor; and
(j) a delay circuit for producing an output by which said inhibiting means is rendered operative after a predetermined time interval from the setting of said X contact to said second state.

5. A flash device according to claim 4, further including a charge completion signal forming circuit for producing a charge completion signal when the voltage on said main capacitor has reached a predetermined value, and wherein said applying means is rendered operative when said charge completion signal is produced and when said X contact is set to the second state.

6. A flash device comprising:
(a) flash means for generating light for flash use;
(b) a main condenser for storing flash energy;
(c) a signal forming circuit for producing a signal when the energy stored in the main condenser becomes a predetermined value;
(d) a capacitor for storing energy;
(e) a trigger circuit for triggering said flash means, said trigger circuit becoming operative by virtue of the energy stored in the capacitor to trigger the flash means;
(f) a terminal connectable to an X contact of a camera, said X contact arranged to be moved from a first state to a second state by a shutter release operation;
(g) detecting means connected to said terminal for detecting the states of the X contact and the signal from said signal forming circuit, said detecting means producing an output signal when the X contact is in the second state and the signal forming circuit is providing the signal as an output;
(h) applying means for transferring the energy stored in the capacitor to the trigger circuit corresponding to the output of the detecting means; and
(i) inhibiting means for inhibiting energy storage by said capacitor, said inhibiting means operating when the X contact is set in the second state after the trigger circuit has operated.

7. A flash device comprising:
(a) flash means for generating light for flash use;
(b) a main condenser for storing flash energy;
(c) a signal forming circuit for producing a signal when the energy stored in the main condenser becomes a predetermined value;
(d) a capacitor for storing energy;
(e) a trigger circuit for triggering said flash means;
(f) a terminal couplable to an X contact of a camera, said X contact arranged to be moved from a first state to a second state by a shutter release operation;
(g) applying means connected to said terminal for applying the energy of said capacitor to said trigger circuit so that said trigger circuit is rendered operative when said X contact is set to the second state based on the signal from said signal forming circuit and the state of said X contact;
(h) inhibiting means for inhibiting energy storing operation of said capacitor; and
(i) a delay circuit for producing an output by which said inhibiting means is rendered operative after a predetermined time interval from the setting of said X contact to said second state.

8. A flash device comprising:
(a) flash means for generating light for flash use;
(b) a main condenser for storing flash energy;
(c) a signal forming circuit for producing a signal when the energy stored in said main condenser becomes a predetermined value;
(d) a capacitor for storing energy;
(e) a trigger circuit for triggering said flash means;
(f) a terminal couplable to an X contact, said X contact arranged to be moved from a first state to a second state by a shutter release operation;
(g) first switching means connected to said terminal, responsive to the signal from said signal forming circuit for transmitting the energy of said capacitor to said trigger circuit to thereby render operative said trigger circuit when said X contact is set to the second state;
(h) second switching means connected in parallel to said capacitor; and
(i) a delay circuit actuated by the setting of said X contact to the second position for producing an output by which said second switching means is turned on after a predetermined time interval.

9. A flash device comprising:
(a) flash means for generating light for flash use;
(b) a main condenser for storing energy;
(c) a signal forming circuit for producing a signal when the energy stored in the main condenser becomes a predetermined value;
(d) a terminal couplable to an X contact of a camera, said X contact arranged to be moved from a first state to a second state by a shutter release operation;
(e) detecting means connected to said terminal for detecting the states of the X contact and the signal from said signal forming circuit, said detecting means producing an output signal only when the X contact is in the second state and the signal forming circuit is providing the signal as an output;
(f) a trigger circuit for triggering said flash means in response to the output signal from the detecting means; and
(g) inhibiting means for inhibiting the operation of said trigger circuit, said inhibiting means operating when the X contact is set in the second state after the trigger circuit has operated.

10. A flash device according to claim 6, which further comprises means for making operative the inhibiting means a predetermined time after the X contact is set in the second state.

11. A flash device according to claim 9, which further comprises means for making operative the inhibiting means a predetermined time after the X contact is set in the second state.

* * * * *